United States Patent
Taware et al.

(10) Patent No.: US 12,132,620 B2
(45) Date of Patent: Oct. 29, 2024

(54) SYSTEM AND METHOD FOR ARTIFICIAL INTELLIGENCE ASSISTED SERVICE CATALOGUE GENERATION FOR NETWORK SERVICE PROVISIONING

(71) Applicant: INFOSYS LIMITED, Bangalore (IN)

(72) Inventors: Vishwanath Taware, Broomfield, CO (US); Allahbaksh Mohammedali Asadullah, Hubli (IN); Ankur Goel, Pune (IN); Ashay Kharpate, Pune (IN); Gaurav Saxena, Pune (IN); Praveen Santhakumari, Trivandrum (IN); Lalit Nayar, Tampa, FL (US)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 17/704,954

(22) Filed: Mar. 25, 2022

(65) Prior Publication Data

US 2023/0300033 A1     Sep. 21, 2023

(30) Foreign Application Priority Data

Mar. 16, 2022  (IN) .............................. 202241014163

(51) Int. Cl.
*H04L 41/16* (2022.01)
*G06F 16/28* (2019.01)
*H04L 67/51* (2022.01)

(52) U.S. Cl.
CPC ............ *H04L 41/16* (2013.01); *G06F 16/285* (2019.01); *H04L 67/51* (2022.05)

(58) Field of Classification Search
CPC ........ H04L 41/16; H04L 67/51; G06F 16/285
USPC ......................................................... 709/220
See application file for complete search history.

(56) References Cited

U.S. PATENT DOCUMENTS

| | | | | |
|---|---|---|---|---|
| 2013/0104251 | A1* | 4/2013 | Moore | G06F 21/602 |
| | | | | 726/30 |
| 2019/0065597 | A1* | 2/2019 | Murray | G06N 20/00 |
| 2021/0279066 | A1* | 9/2021 | Xiao | G06F 9/3891 |

* cited by examiner

*Primary Examiner* — Suraj M Joshi
(74) *Attorney, Agent, or Firm* — Finnegan, Henderson, Farabow, Garrett & Dunner LLP

(57) ABSTRACT

A method and/or system for Artificial Intelligence assisted service catalogue generation for network service provisioning is disclosed. The method comprising receiving input data which comprises either or combination of one or more specification documents or one or more configuration changes in network functions and/or network components. The entities and attributes of the entities are extracted from the input data which are then reconciled with graph database representing network function model to determine modifications in the input data. The graph database is updated based on the modifications identified in the input data, and recommendations comprising model elements are generated using AI engines which are displayed at the service modeler interface for generation of the service catalogue for network service provisioning.

20 Claims, 11 Drawing Sheets

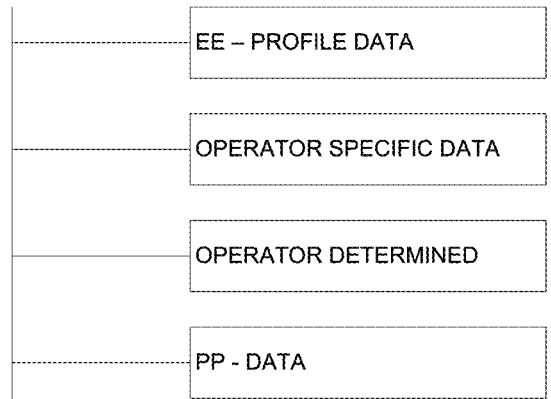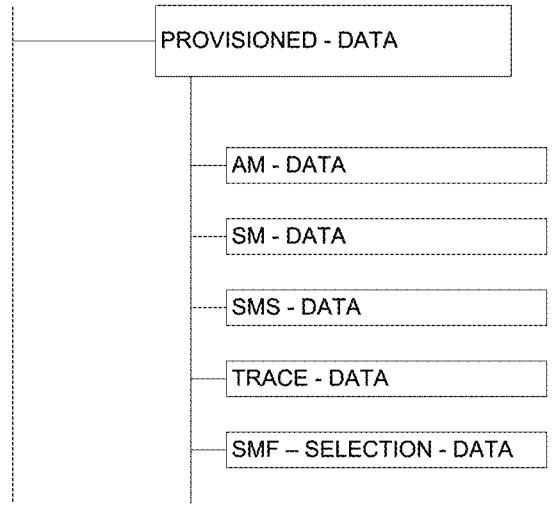
FIGURE 8

SYSTEM AND METHOD FOR ARTIFICIAL INTELLIGENCE ASSISTED SERVICE CATALOGUE GENERATION FOR NETWORK SERVICE PROVISIONING

This application claims the benefit of Indian Patent Application No. 202241014163, filed Mar. 16, 2022, which is incorporated by reference in its entirety.

FIELD

The present technique relates to Artificial Intelligence (AI) systems. More specifically, the technique relates to Artificial Intelligence system for network service provisioning for Software Defined Wireless and Wireline Network.

BACKGROUND

In each decade, the pace at which Communication Service Providers (CSPs) need to create new products and amend/extend existing products has kept on increasing due to technology changes in network like 4G (Fourth generation of broadband cellular network technology) to 5G (Fifth generation technology standard for broadband cellular networks), Copper to Fiber, Physical to Logical, Virtualized to Containerized as well as evolving customer needs and usage patterns from voice to messaging services. In this and further decades, Software Defined Networks (SDN) and Network Function Virtualization (NFV) will further liberate range of choices for the CSPs to build network using interesting but at the same time vastly higher number of individual network functions are coming from multiple vendors and are being deployed on public and private cloud. Present day catalogue solutions help to some extent by letting product managers model a finite number of reusable building blocks of product components first and then assembling a large range of sellable products from them using abstract views. Now the mobile network 5G and the new over-the-top services like SD-WAN (Software-Defined Wide Area Network) bring new dynamics when modeling the service catalogue (network resource/RFS catalogue) which depends on aspects such as, but not limited to—how the communication service providers sell it commercially; how to provision the resources on the network based on the Network OEM (Original Equipment Manufacturer) specifications; how to keep up with standards such as 3GPP, ONAP, GSMA, TMF, MEF other standard to maintain the interoperability; and/or how to discover the configurations changes in the network function and domain orchestration.

3GPP is a 3rd Generation Partnership Project is an umbrella term for number of standards under which organizations develop protocols for mobile telecommunications. ONAP stands for Open Network Automation Platform which is an open-source networking project hosted by the Linux Foundation. GSMA stands for GSM Association which is an industry organization that represents the interests of mobile network operators worldwide). TMF stands for TM Forum which is a global industry association for service providers and their suppliers in the telecommunications industry. MEF stands for Metro Ethernet Forum which is an is a nonprofit international industry consortium, of network, cloud, and technology providers.

Manually keeping a tab on all these disruptors with potentially exponential growth in the components and their variations is time consuming and error prone. PLM (Product Life Cycle Management) tools do not provide any recommendation and analysis capabilities for designers who links their locally held Product/Service catalogue models to external databases where standards documentation from Industry Standard bodies are released or where vendors release their package revisions. All changes are therefore manually analyzed post which revisions can be made in PLM catalogue. The service modeler needs to manually analyze the data model dependency reviewing the JSON/XSD provided by the network function OEM provider, validate it with the standard documentations provided by the 3GPP/ONAP/GSMA/MEF specifications, and review the existing commercial and network resource/service catalogue model to build a new or enhance the existing service model.

Major drawback therefore is that most of the work is manual and prone to human error which could cause incorrect Operation Support System (OSS) development and in worst cases if it goes unnoticed during Dev-Test-Deploy, then impacting live orders in production and then ultimately impacts the order fallout in network provisioning and order management orchestration/decomposition. In the existing modeling technology, the dependency and impact analysis are left to the modelers. There is a need of technology to overcome the above-mentioned problem.

SUMMARY

As highlighted in the background section, there is a need of automated solution in the hands of communication/telecommunication Product & Service modelling team—to filter, assimilate and validate right parts of model impacting information before they confidently make changes.

The technology described in the present disclosure overcomes the above-mentioned technical problem through a system, a method and/or non-transitory computer readable storage medium for artificial intelligence assisted service catalogue generation for network service provisioning and/or network resource provisioning.

In one aspect, a computer implemented method for Artificial Intelligence (AI) assisted service catalogue generation for network service provisioning is disclosed. The method comprising, receiving input data which comprises either or combination of one or more specification documents or one or more configuration changes in network functions and/or network components. The one or more configuration changes may be received from data sources such as, but not limited to, network inventory, network configuration repository, network deployment CI/CD pipelines, Subscriber Identity Module (SIM) management information and/or end user device management information (or simply referred as Device Management information). The one or more specification documents comprises at least one of, but not limited to, standard documents describing communication protocols, industry standards, interface specifications and/or network functions released by, but not limited to, 3GPP, GSMA, TMF and/or MEF. One or more entities and attributes of the one or more entities are extracted from the input data. The extracted one or more entities and the attributes of the one or more entities are reconciled with a graph database representing network function model to determine modifications in the input data.

The reconciliation is executed by classifying the one or more entities extracted from the input data and updating the graph database on determining that either the extracted one or more entities or the attributes of the one or more entities are absent in the graph database. The graph database is updated by creating a new node in the graph database for each of the one or more entities when the extracted one or more entities are absent in the graph database. When the extracted attributes of the one or more entities is absent in the graph database, the attributes of the one or more entities are either created or updated in the graph database. One or more recommendations comprising model elements are generated using AI engines, based on the reconciliation. The one or more recommendations comprise either addition or modifications of model elements to the service catalogue. The generated one or more recommendations are displayed at the service modeler interface for generation of the service catalogue for network service provisioning.

In another aspect, a system for Artificial Intelligence (AI) assisted service catalogue generation for network service provisioning is disclosed wherein the system comprises at least one processor, at least one memory unit operatively coupled to the at least one processor, having instructions stored thereon that, when executed by the at least one processor, causes the at least one processor to receive input data which comprises either or combination of one or more specification documents or one or more configuration changes in network functions and/or network components. The one or more configuration changes may be received from data sources such as, but not limited to, network inventory, network configuration repository, network deployment CI/CD pipelines, Subscriber Identity Module (SIM) management information and/or end user device management information (or simply referred as Device Management information). The one or more specification documents comprises at least one of, but not limited to, standard documents describing communication protocols, industry standards, interface specifications and/or network functions released by, but not limited to, 3GPP, GSMA, TMF and/or MEF. One or more entities and attributes of the one or more entities are extracted from the input data. The extracted one or more entities and the attributes of the one or more entities are reconciled with a graph database representing network function model to determine modifications in the input data.

The reconciliation is executed by classifying the one or more entities extracted from the input data and updating the graph database on determining that either the extracted one or more entities or the attributes of the one or more entities are absent in the graph database. The graph database is updated by creating a new node in the graph database for each of the one or more entities when the extracted one or more entities are absent in the graph database. When the extracted attributes of the one or more entities is absent in the graph database, the attributes of the one or more entities are either created or updated in the graph database. One or more recommendations comprising model elements are generated using AI engines, based on the reconciliation. The one or more recommendations comprise either addition or modifications of model elements to the service catalogue. The generated one or more recommendations are displayed at the service modeler interface for generation of the service catalogue for network service provisioning.

In yet another aspect, a non-transitory computer readable storage medium for Artificial Intelligence (AI) assisted service catalogue generation for network service provisioning is disclosed wherein the non-transitory computer readable medium comprising machine executable code which when executed by at least one processor, causes the at least one processor to perform steps comprising receiving input data which comprises either or combination of one or more specification documents or one or more configuration changes in network functions and/or network components. The one or more configuration changes may be received from data sources such as, but not limited to, network inventory, network configuration repository, network deployment CI/CD pipelines, Subscriber Identity Module (SIM) management information and/or end user device management information (or simply referred as Device Management information). The one or more specification documents comprises at least one of, but not limited to, standard documents describing communication protocols, industry standards, interface specifications and/or network functions released by, but not limited to, 3GPP, GSMA, TMF and/or MEF. One or more entities and attributes of the one or more entities are extracted from the input data. The extracted one or more entities and the attributes of the one or more entities are reconciled with a graph database representing network function model to determine modifications in the input data.

The reconciliation is executed by classifying the one or more entities extracted from the input data and updating the graph database on determining that either the extracted one or more entities or the attributes of the one or more entities are absent in the graph database. The graph database is updated by creating a new node in the graph database for each of the one or more entities when the extracted one or more entities are absent in the graph database. When the extracted attributes of the one or more entities is absent in the graph database, the attributes of the one or more entities are either created or updated in the graph database. One or more recommendations comprising model elements are generated using AI engines, based on the reconciliation. The one or more recommendations comprise either addition or modifications of model elements to the service catalogue. The generated one or more recommendations are displayed at the service modeler interface for generation of the service catalogue for network service provisioning.

The method, the system, and/or the non-transitory computer readable storage medium disclosed herein may be implemented in any means for achieving various aspects and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE FIGURES

Example embodiments are illustrated by way of example and not limitation in the figures of the accompanying drawings, in which like references indicate similar elements and in which:

FIG. 8 depicts the resource model and the resource attributes from the 3GPP specification document, according to one or more embodiments.

Other features of the present embodiments will be apparent from the accompanying drawings and from the detailed description that follows.

DETAILED DESCRIPTION

The invention in the present disclosure is aimed to overcome the technical problem mentioned in the background section through a system and/or method for Artificial Intelligence (AI) assisted service catalogue generation for network service provisioning as well as the network resource provisioning, as disclosed in various embodiments of the present disclosure.

In one or more embodiments, a method, system and/or computer readable storage medium for Artificial Intelligence (AI) assisted service catalogue generation for network service provisioning is disclosed. The method comprising, receiving input data which comprises either or combination of one or more specification documents or one or more configuration changes in network functions and/or network components. The one or more configuration changes may be received from data sources such as, but not limited to, network inventory, network configuration repository, network deployment CI/CD pipelines, Subscriber Identity Module (SIM) management information and/or end user device management information (or simply referred as Device Management information). The one or more specification documents comprises at least one of, but not limited to, standard documents describing communication protocols, industry standards, interface specifications and/or network functions released by, but not limited to, 3GPP, GSMA, TMF and/or MEF. One or more entities and attributes of the one or more entities may be extracted from the input data. The extracted one or more entities and the attributes of the one or more entities may be reconciled with a graph database representing network function model to determine modifications in the input data.

The reconciliation may be executed by classifying the one or more entities extracted from the input data and updating the graph database on determining that either the extracted one or more entities or the attributes of the one or more entities are absent in the graph database. The graph database may be updated by creating a new node in the graph database for each of the one or more entities when the extracted one or more entities are absent in the graph database. When the extracted attributes of the one or more entities is absent in the graph database, the attributes of the one or more entities may either be created or updated in the graph database. One or more recommendations comprising model elements may be generated using AI engines, based on the reconciliation. The one or more recommendations comprise either addition or modifications of model elements to the service catalogue. The generated one or more recommendations may be displayed at the service modeler interface for generation of the service catalogue for network service provisioning.

Figure 1:
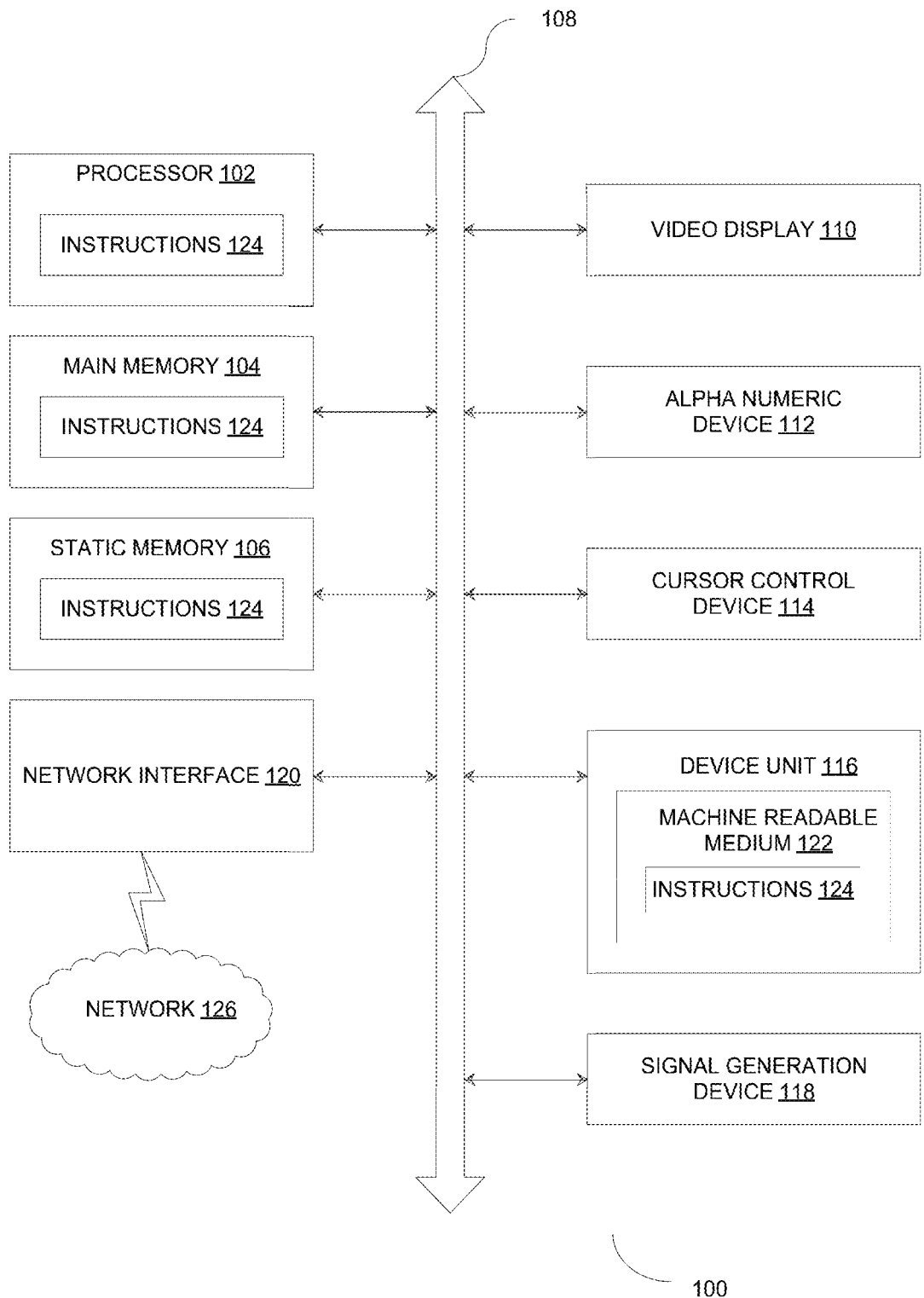
FIG. 1 is a diagrammatic representation of a data processing system capable of processing a set of instructions to perform any one or more of the methodologies herein, according to one or more embodiments.

FIG. 1 is a diagrammatic representation of a machine and/or data processing device capable of processing a set of instructions to perform any one or more of the methodologies herein, according to one embodiment. The machine and/or the data processing device in the example form, comprises a computer system 100 within which a set of instructions, for causing the machine to perform any one or more of the methodologies discussed herein, may be executed. In various embodiments, the machine operates as a standalone device and/or may be connected (e.g., networked) to other machines.

A machine may be a personal computer (PC), laptop or an embedded system and/or any machine capable of executing a set of instructions (sequential or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD), Light Emitting Diode (LED) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker), and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104, within the static memory 106 and/or within the processor 102 during execution thereof by the computer system 100, the main memory 104 and the processor 102 also constituting machine-readable media.

The instructions 124 may further be transmitted and/or received over a network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is configured for storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media, and magnetic media.

In telecom industry, there are two basic support system, one—a business support system (BSS) also called as commerce platform/application and another—operation support system (OSS) also called as production platform/application. When a customer chooses a service plan, all data related to the chosen service plan will be stored as a part of product catalogue and then gets converted into Network Resource Facing Services which then actually gets provisioned on the network. The production platform has the relationship with the commerce application and network application.

The 5G network is different from traditional 4G network where everything becomes Cloud Native Network Function (CNF). Whether it is call, message and/or browsing—all are controlled by software on top of it. IP Multimedia Core Network Subsystem (IMS) takes care of voice calls and supports 4G multimedia messaging (MMS) compatibility. In case of roaming, the transition happens on partner network and allowable service validation is performed on the home network. All these information needs to be configured into a catalogue and that information needs to be pushed down to the network i.e., information on which service plan the customer/user has subscribed to and how services are to be provided to customer/user such as, but not limited to download speed, upload speed, incoming and outgoing calls and/or Messaging (SMS/MMS) services enablement. All configuration happens from the top and the gets duplicated to two parts—how can user be billed and whether what is purchased is configured on the network—this is defined and automated.

All communication/telecom operators will have four parts—network configuration, service provisioning, commercial aspects, and compliance. Commercial catalogue is also termed as Customer Facing Services (CFS) which gets more details from service catalogue (RFS—Resource Facing Services). Resource specific service which acts as a bridge between commercial catalogue and network configuration provides more details—Ex—upload and download speed limit to restrict the quality of video or browsing, is defined in service catalogue. RFS needs to be checked to see if there are any changes in network function/component configuration. VNF (Virtual Network Functions) and CNF (Cloud native Network Function) are controlled by various characteristics which impacts the upload and download speed.

The typical telecom's service catalogue (RFS—Resource Facing Service Model, the service which are provisioned on network) comprises 4 steps—defining the model; operationalization of the model; reconciliation of the model for upkeeping the model with constant changes on the network function configuration and commercial offers; and retiring the model once they become obsolete. While modelling, it is important to give assistance and validation to service modeler. In order to provide assistance, it needs to be searched in entire list of changes that has happened to various parameters to optimize the cost (both the commercial and computation/network etc.). If there are any changes to commercial catalogue or network functions/components or heterogeneous network functions/components, it may impact the Network Resource Facing Services. When there are changes as mentioned above and if a service model is to be designed to launch a new product (service package) in the market for the customers, the invention described in the present disclosure automatically identifies all the changes in the components and generates recommendation for a service modeler see that what all components need to be looked at to define a new product or services. For example—highlighting a conflict that a network configuration parameter has changed and hence the service catalogue model that has been designed may not work because of the quality of certain parameter (latency, download speed and upload speed).

Figure 2:
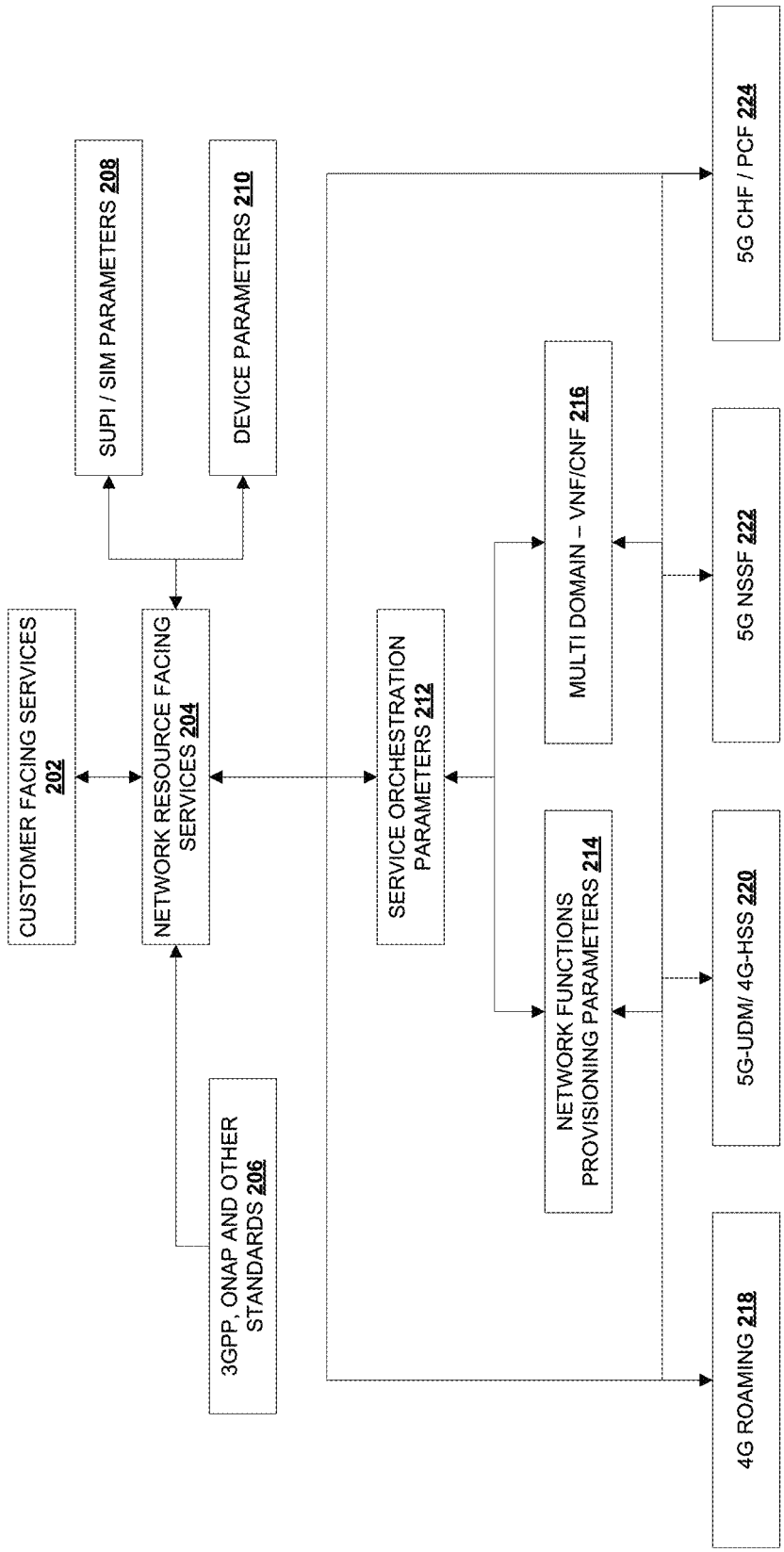
FIG. 2 is a block diagram illustrating various aspects involved in network service provisioning, according to one or more embodiments.

FIG. 2 is a block diagram illustrating various aspects involved in network service provisioning such as, but not limited to Customer Facing Services 202, Network Resource Facing Services 204, 3GPP, ONAP and other standards 206, SUPI/SIM parameters 208, device parameters 210, service orchestration parameters 212, network functions provisioning parameters 214, multi domain—VNF/CNF 216, network functions 4G roaming 218, network functions 5G-UDM/4G-HSS 220, network functions 5G NSSF 222 and network functions 5G CHF/PCF 224. This architecture diagram in FIG. 2 provides the typical applications used for network resource provisioning or network service provisioning, their integrations and illustrate the impacted 5G network functions (218, 220, 222 and 224). The arrows specifies whether the interaction is unidirectional or bi-directional.

In one or more embodiments, the Customer Facing Services (CFS) 202 may be a service that is represented as product offerings to the customers as commercial catalogue (also referred as product catalogue) which helps determine the types of products a service provider can sell, to whom they can sell, for how much and under what terms. It also allows service providers to quickly define new products or adjust existing ones and respond to new offerings from competitors. The commercial catalogue is stored in XML or JSON format.

In one or more embodiments, Network Resource Facing Services (RFS) 204 may describe how Customer Facing Services 202 are configured. For example, a service provider can provision a Customer Facing Services 202 named Internet_Access using multiple Resource Facing Services, such as Digital Subscriber Line (DSL) or Fiber. The Network Resource Facing Services 204 are identified/selected based on which the Customer Facing Services 202 to be provided to customers are designed. Network Resource Facing Services 204 are network technology-specific; however, Network Resource Facing Services 204 are not specific to any communication service provider/vendor. Network Resource Facing Services 204 may be defined using parameters such as, but not limited to, SUPI/SIM parameters 208, device parameters 210, service orchestration parameters 212 and/or standards 206 such as, but not limited to 3rd Generation Partnership Project (3GPP), Open Network Automation Platform (ONAP) and other standards.

In one or more embodiments, the service orchestration is the execution of operational and functional processes involved in designing, creating, and delivering an end-to-end service. The service orchestration parameters 212 may comprise network function provisioning parameters 214 and multi-domain network function implementation 216. The network function provisioning parameters 214 may comprise one or more parameters such as, but not limited to, data related to 4G roaming 218, subscriber related information which are stored in Home Subscriber Service (HSS) 220 in case of 5G network (For example, accessAndMobilitySubscriptionData-ueAmbrUpLink for home data services), subscriber related information which are stored in Unified Data model (UDM) 220 in case of 4G network, 5G Network Slice Selection Function (NSSF) 222, 5G new charging function (CHF)/Policy Control Function (PCF) 224. The multi-domain network function implementation 216 may comprise implementation such as, but not limited to Virtual Network Function (VNF) and Cloud-Native Network Function (CNF)

which has different configuration for the NVFI (Network Virtual Function Infrastructure), VNF has virtualization technology parameter in NVFI whereas CNF has containerized technology parameters. Such complex interrelated components/aspects make it difficult to analyze and perform network service provisioning or network resource provisioning by creating a service catalogue manually, and in such cases the technology described in the present disclosure eliminates manual intervention and automates the process, which is described in subsequent paragraphs of the present disclosure.

Figure 3:
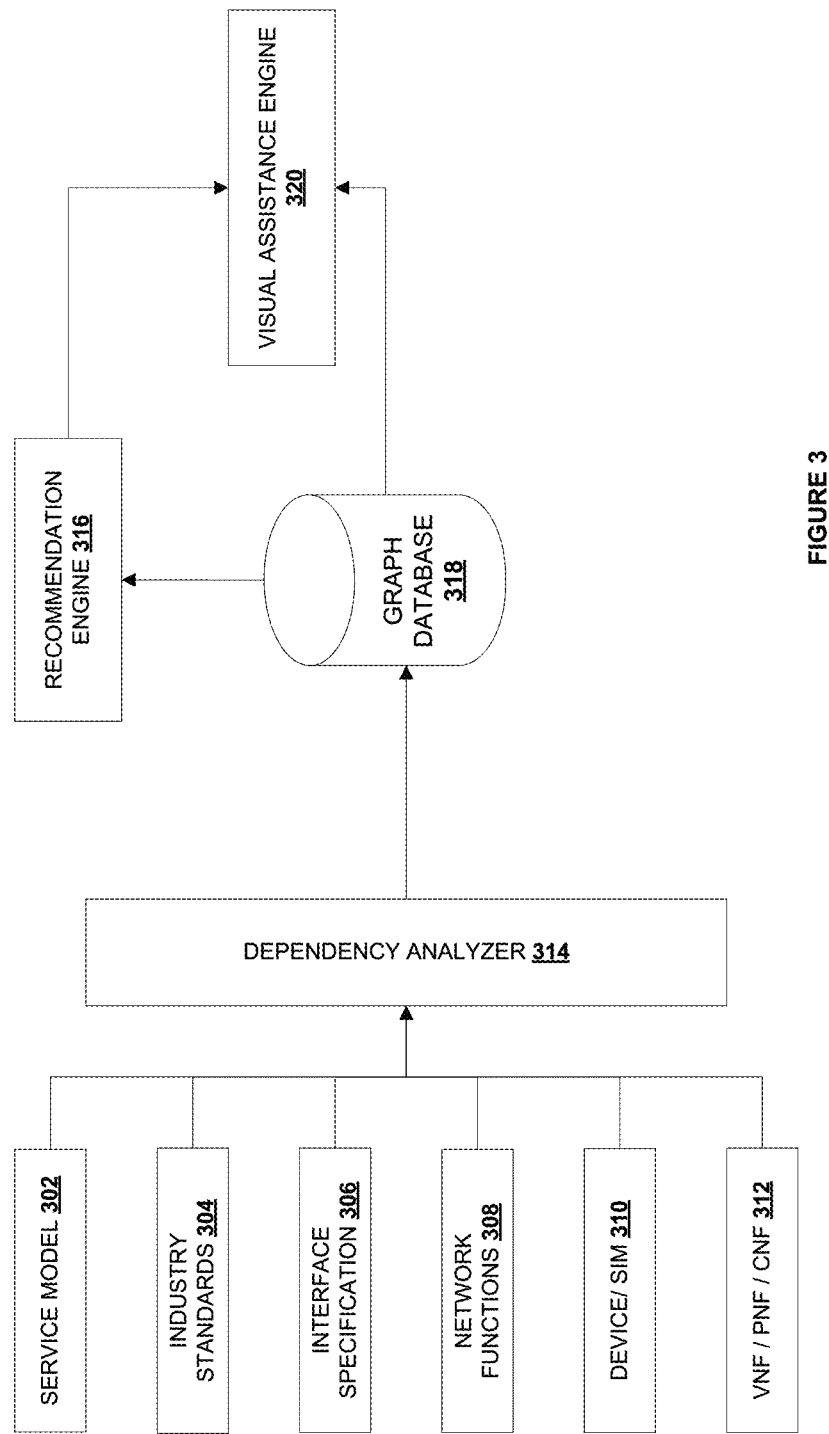
FIG. 3 is an architecture diagram illustrating components of a system for Artificial Intelligence (AI) assisted service catalogue generation for network service provisioning, according to one or more embodiments.

FIG. 3 is an architecture diagram illustrating components of a system for Artificial Intelligence (AI) assisted service catalogue generation for network service provisioning, according to one or more embodiments. In one or more embodiments, the system comprises one or more components, but not limited to service model information 302, industry standards 304, interface specification 306, network functions 308, device/SIM configuration parameters 310, VNF/PNF/CNF 312, a dependency analyzer 314, a recommendation engine 316, a graph database 318 and a visual assistance engine 320. The service model information 302 may comprise list of service models that are designed by the service modeler for a telecom operator. The communication industry uses the SID (Shared Information Model) which is hierarchical star schema type data structure which provides the relationship between the offers to product specification to CFS to RFS. The industry standards 304 comprises one or more documents that define standards such as, but not limited to 3GPP and/or ONAP. Interface specification 306 may comprise one or more documents defining configuration parameters, API/Integration specifications. The device/SIM configuration parameters 310 may comprise the SIM profile which specifies the details on parameters for SIM to connect to the network and manage the communication and signaling between the device and network. The device specifications comprise device operating system and other connectivity parameters to connect with the network and carrier specific configuration parameters. The VNF/PNF/CNF 312 may comprise of configuration parameters which are required to recognize the SIM and Device to connect to the network and provide the communication services.

In one or more embodiments, the dependency analyzer 314 which is an Artificial Intelligence engine (AI engine) may be configured to receive input data, analyze the input data, correlate the input data, reconcile, and create models and/or generate recommendation through recommendation engine 316 as described in various embodiments of the present disclosure. The input data received may be, but not limited to one or more specification documents comprising at least one or combination of industry standards 304, interface specifications information 306 and network functions information 308. The input may also comprise service model information 302 related to existing service catalogue which needs review and modifications, one or more configuration changes information for example DNN (Data Network Name) or Slice ID (SNSSAI—Single Slice Selection Assistance Information) obtained from network components configuration management system or platform. As mentioned in earlier paragraphs, the service model information 302, the industry standards 304 and the interface specification 306 may be in the form of document(s) which may be parsed to extract one or more entities and attributes associated with the one or more entities. In any catalogue in XML format, opening and closing tags are entities and the data present between the opening and closing tag is attribute.

Figure 9:
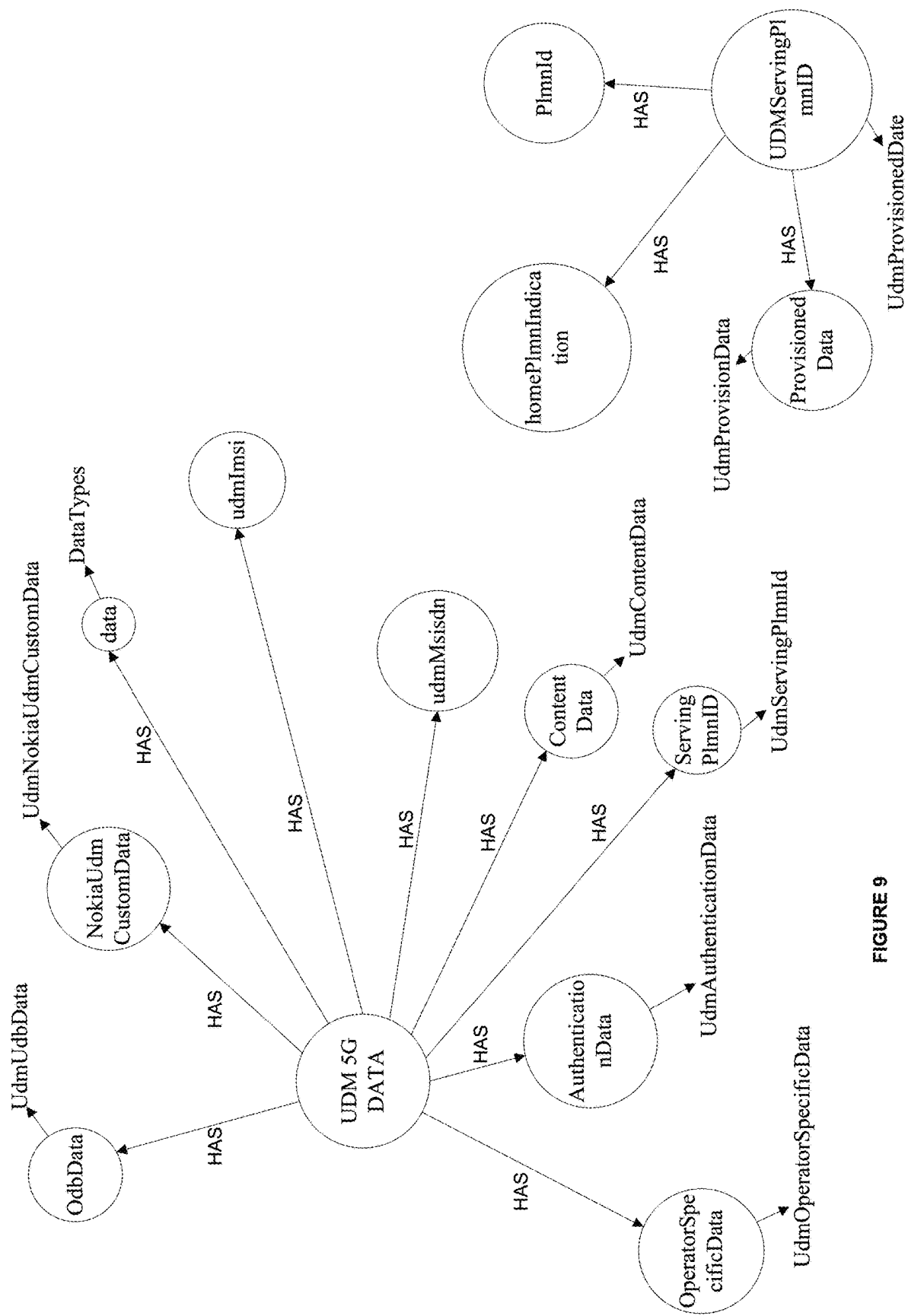
FIG. 9 is an exemplary graph database, according to one or more embodiments.

Few examples of attributes are Namf_Location_ProvideLocationInfo from 3GPP document (Industry Standard 3GPP) or serviceAreaRestriction from Service Catalog. The extracted one or more entities and attributes associated with the one or more entities may be classified into pre-defined categories such as, but not limited to, configuration parameters for network provisioning UDM (Unified Data Model), Device management, SIM management, or Subscriber Services management parameters and may be reconciled by the dependency analyzer 314 with the graph database 318 to determine whether one or more entities in the form of node and the attributes of the one or more entities in the form of edges are present in the graph database 318. If at least one of the extracted one or more entities is not present in the graph database 318, a node may be created in the graph database 318 and edge may be created for the node, based on the attributes associated with each of the one or more entities. If one or more entities are present in the graph database 318 in the form of node and the attributes associated with the one or more entities is either not present or an old attribute is present in the graph database 318, then the edge information of the node representing those one or more entities may be updated. The input data is reconciled with graph database 318 as mentioned above and the dependency analyzer 314 may determine the modifications that are made in graph database 318. An exemplary graph indicating entities and attributes stored in graph database 318 is illustrated in FIG. 9. The recommendation engine 316 which is an Artificial Intelligence engine (AI Engine) may be configured extract the modification information from graph database 318 to determine the changes in the graph database 318 and to generate recommendation indicating the modifications to be made in the service catalogue so that the service catalogue is complying across the network. The recommendation engine 316 may be configured to send the recommendations to the visual assistance engine 320 and the visual assistance engine 320 may be configured to display the recommendation at the interface associated with the service modeler which facilitates the service modeler to generate or update the service catalogue.

Figure 4:
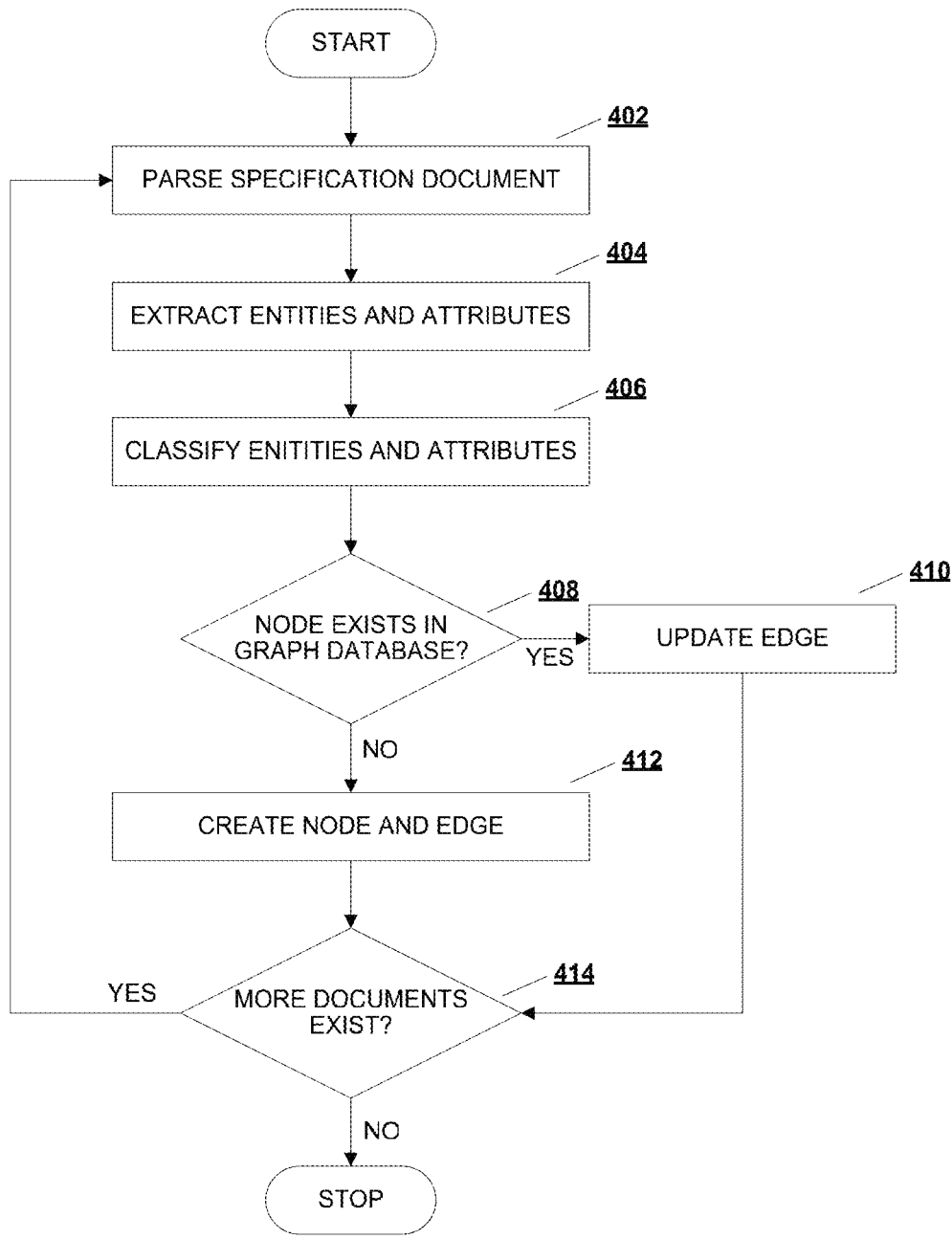
FIG. 4 is a flow chart illustrating sequence of steps executed by the dependency analyzer (as illustrated in FIG. 3) of system for Artificial Intelligence (AI) assisted service catalogue generation for network service provisioning, according to one or more embodiments.

FIG. 4 is a flow chart illustrating sequence of steps executed by the dependency analyzer 314 (as illustrated in FIG. 3) of system for Artificial Intelligence (AI) assisted service catalogue generation for network service provisioning, according to one or more embodiments. As described in various embodiments of the present disclosure, part of the input may comprise one or more documents such as industry standards documents, interface specification document etc. In one or more embodiments, at least one of the one or more specification documents may be parsed, as in step 402. The parsed documents may be used to train the AI system for identification of entities and attributes. One or more entities and attributes associated with one or more entities may be extracted, as in step 404. The one or more entities and attributes associated with one or more entities may be extracted using extraction methodologies such as, but not limited to Named Entity Extraction model or Stanford Question Answering Dataset (SQuAD) model using which noun, verbs and pronouns may be extracted from the one or more documents. A noun may be mapped to the path variable in API specification document which provides the integration specifications like input parameters, output response, and error response. The verb may act as query parameter and the adjective may also be part of query parameter. Verb and Adjective are packaged as POST, GET, patch, PUT, DELETE request, which provides the action that needs to be taken on the functionality, for example GET is to retrieve the information, POST to insert the new information. The extracted nouns, verbs and pronouns are extracted, wherein nouns considered as entities; and pronouns, verbs and adjectives are considered as attributes.

The extracted one or more entities and attributes associated with the one or more entities may be classified as configuration parameters for network provisioning UDM (Unified Data Model), Device management, SIM management, or Subscriber Services management parameters, as in step 406 and may be reconciled with graph database to check whether the extracted each of the one or more entities and attributes associated with each of the one or more entities are present in the graph database. For each of the one or more entities, if the node exists in the graph database as per check in step 408, the edge information of the node may be updated in the graph database, as in step 410. If the node doesn't exist in graph database as per the check in step 408, a node and edge may be created using the entity and the attribute respectively, as in step 412. The steps 408, 410 and 412 may be executed iteratively till all the entities and attributes are checked. If more documents exist as per the check in step 414, the step 402 may be executed, and the process may continue till all the documents are parsed.

Figure 5:
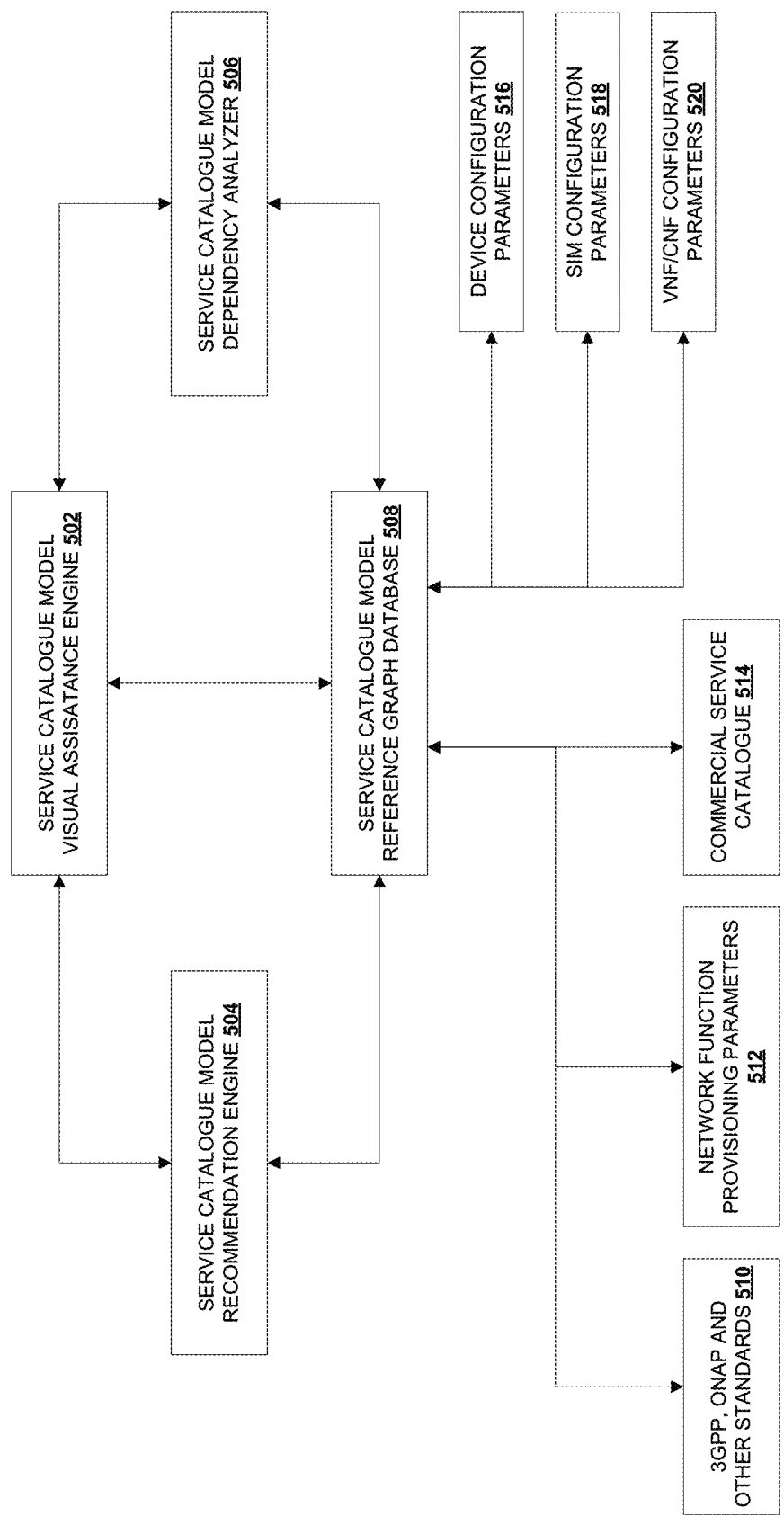
FIG. 5 is an architecture diagram illustrating components of a system for Artificial Intelligence (AI) assisted service catalogue generation for network service provisioning, according to one or more embodiments.

FIG. 5 is an architecture diagram illustrating components of a system for Artificial Intelligence (AI) assisted service catalogue generation for network service provisioning, according to one or more embodiments. In one or more embodiments, the system may comprise one or more components, but not limited to, service catalogue model visual assistance engine 502, service catalogue model recommendation engine 504, service catalogue model dependency analyzer 506, and service catalogue model reference graph database 508. The service catalogue model reference graph database 508 may be configured to store one or more computer readable documents related to standards such as 3GPP, ONAP and other standards 510, network function provisioning parameters 512 and commercial service catalogue 514. One or more parameters such as device configuration parameters 516, SIM configuration parameters 518 and VNF/CNF configuration parameters 520 may be stored in service catalogue model reference graph database 508. The device configuration parameters 516 may comprise information relating to firmware update and/or OS update on the device (also referred as end user device). The SIM configuration parameters 518 may comprise information such as Data Network Name (DNN), Integrated Circuit Card Identifier (ICCID), Public Land Mobile Network (PLMN) and Generic Public Subscription Identifier (GPSI) which could be Mobile Subscriber ISDN (MSISDN). The VNF/CNF configuration parameters 520 may comprise Network function configuration details for NFVI (Virtualization/containerization), MANO (management and orchestration).

In one or more embodiments, the necessary input data for the system may be stored in the service catalogue model reference graph database 508. The service catalogue model dependency analyzer 506 may be configured to access all the input data from the service catalogue model reference graph database 508, parse and analyze the input data and the text data present in one or more documents through OCR or text extraction method to find semantic mapping between information present in the documents. For example, the 3GPP, TMF, ONAP and other standard documents will be parsed in iterations and the changes to the network function interface specifications—such details may be parsed and captured by the system and may be stored at the service catalogue model reference graph database 508.

The service catalogue model dependency analyzer 506 which is an Artificial Intelligence (AI) engine, may analyze impacts to the existing service catalogue and may identify the impacted areas such as, but not limited to device config parameter 516, SIM configuration parameter 518, and/or network function configuration parameters 520 (VNF/CNF configuration parameters 520), by identifying one or more entities and attributes associated with one or more entities in the input data. These impacts may be classified by service catalogue dependency analyzer 506 to highlight the service catalogue impacts on the resource or commercial specifications through the service catalogue model visual assistance engine 502.

Similarly, when the carrier/service provider is launching a new commercial product which has network service impacts such as—launching the new service which comprises the network slice changes, the service catalogue model recommendation engine 504 may identify the dependency on the network functions as well as analyze the impact to other service and resource catalogue items which are stored in the service catalogue model reference graph database 508. Any anomaly in changes and other dependency like device configuration parameters 516, SIM configuration parameters 518, and/or network function configuration parameters 520 (VNF/CNF) will be highlighted by the service catalogue model visual assistance engine 502. The system may perform same recommendation approach to generate the service catalogue recommendation when the SIM profile or Device firmware changes which impacts network function provisioning.

In an exemplary embodiment, consider a document UDM 5G-DATA as mentioned below.

```
<xs:annotation>
<xs:documentation>UDM 5G-DATA</xs:documentation>
</xs:annotation>
<xs:complexContent>
<xs:extension base="spml:SecondClassObject">
<xs:sequence>
<xs:element name="data" type="subscriber:DataTypes" minOccurs="0"/>
<xs:element name="udmImsi" type="xsd:string" minOccurs="0" maxOccurs="unbounded"/>
<xs:element name="udmMsisdn" type="xsd:string" minOccurs="0" maxOccurs="unbounded"/>
<xs:element name="authenticationData" type="subscriber:UdmAuthenticationData" minOccurs="0"/>
<xs:element name="contextData" type="subscriber:UdmContextData" minOccurs="0"/>
<xs:element name="servingPlmnId" type="subscriber:UdmServingPlmnId" minOccurs="0" maxOccurs="unbounded"/>
<xs:element name="nokiaUdmCustomData"
```

```
type="subscriber:UdmNokiaUdmCustomData" minOccurs="0"/>
<xs:element name="OdbData" type="subscriber:UdmOdbData" minOccurs="0"/>
<xs:element name="operatorSpecificData"
type="subscriber:UdmOperatorSpecificData" minOccurs="0"/>
</xs:sequence>
</xs:extension>
</xs:complexContent>
<xs:complexType name="UdmServingPlmnId">
<xs:annotation>
<xs:documentation>UDM Serving PLMNID</xs:documentation>
</xs:annotation>
<xs:complexContent>
<xs:extension base="spml:SecondClassObject">
<xs:sequence>
<xs:element name="plmnId" type="subscriber:NumericString" minOccurs="0"/>
<xs:element name="homePlmnIdIndication" type="xsd:boolean" minOccurs="0"/>
<xs:element name="provisionedData" type="subscriber:UdmProvisionedData"
minOccurs="0"/>
</xs:sequence>
</xs:extension>
</xs:complexContent>
</xs:complexType>
```

In the above-mentioned exemplary document, if there is a change in the specification of the UDM 5G-DATA, one must manually skim through the documents of specification and standards to identify the changes made in such documents. The system is configured to extract one or more entities and attributes associated with one or more entities. In the above exemplary documents, the 'type' data is extracted using entity extraction techniques and then it is determined that in which 'commercial offering' these elements are used. If yes, then which all parameters are changed from previous one. The extracted elements and the properties associated with the elements (which are referred as entities and attributes respectively) are used to create or update an existing knowledge graph in graph database. The elements are connected to other elements through edges and the edges value would be the relationship and the value of relationship is found from the verb which is acting on it. This may be achieved by Part of Speech tagging and entity extraction techniques such as, but not limited to Viterbi algorithm, Brill tagger, Constraint Grammar, and the Baum-Welch algorithm. So, the system extracts type information for each of element and if it is complex type (not string, int etc.) the system attaches different type of properties and connect it to the simple types like string, int etc. This connection might be direct or might be through another element name as node.

In one or more embodiments, the service catalogue model recommendation engine 504 may be configured to derive insights and recommend the appropriate modifications in the catalogue model to the service catalogue model visual assistance engine 502. The service catalogue model recommendation engine 504 may be configured to calculate various costs based on computation requirement, network requirement in comparison with previous catalogue model, to appropriately suggest/recommend the new catalogue model. The recommendation may be generated by algorithms such as, but not limited to Frequent Item Set mining. The service catalogue model visual assistance engine 502 may be configured to display the generated recommendations as graph and/or set of recommendation with explanations at the interface device associated with the service modeler to which helps the service modeler to generate a service catalogue model.

In one or more embodiments, the system may send recommendations as notification(s) to the client device associated with the service modeler and other parties associated with the system. Any changes in the specification may lead to change in the nodes and edges in graph database. The changes in specification are detected automatically and, the node and type information may be extracted. Whether the type of information is same for the sub-graph or not may be identified based on type of node and node ID. If the specification is same, no changes are made to the graph database. If there are changes in the specification, then the reference node may be identified in the graph databased and may be updated. The specification document may be marked, and the system may display the context-based markers on the specification documents at the time of modelling by the service modeler and assist the service modeler to generate/update the service catalogue.

Figure 6:
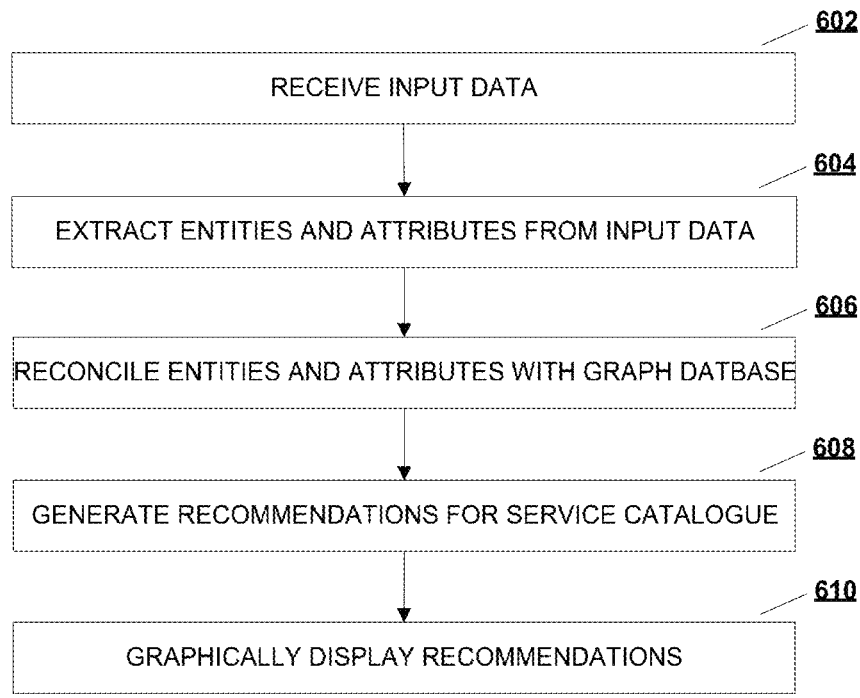
FIG. 6 is a process flow diagram illustrating sequence of steps executed by the system for Artificial Intelligence (AI) assisted service catalogue generation for network service provisioning, according to one or more embodiments.

FIG. 6 is a process flow diagram illustrating sequence of steps executed by the system for Artificial Intelligence (AI) assisted service catalogue generation for network service provisioning, according to one or more embodiments. In one or more embodiments, the system may be configured to receive input data, as in step 602. The input data may comprise either or combination of: one or more specification documents or one or more configuration changes in network components. The one or more specification documents may comprise, but not limited to, industry standards, interface specifications and/or network functions. One or more entities and attributes associated with one or more entities may be extracted, as in step 604. The one or more entities may comprise configuration parameters for network provisioning UDM (Unified Data Model), Device management, SIM management, or Subscriber Services management parameters or Quality of Service parameters. The attributes associated with the one or more entities may comprise of service/resource configuration details on the network functions based on the customer offer, for example ueAmbrUp-Link (Maximum Allowable Upload Speed on Device). The extracted one or more entities and attributes associated the one or more entities may be reconciled with graph database, as in step 606. As described in various embodiments of the present disclosure, the graph database may be configured to store the service/resource network previsioning mandatory parameters, SIM configuration parameters and Device configuration parameters and its relationship with the customer offer and service catalog.

In one or more embodiments, the step of reconciling may be achieved by classifying the one or more entities extracted from the input data, updating the graph database on determining that either the extracted one or more entities or the attributes associated with the one or more entities are absent in the graph database. If the extracted one or more entities are absent in the graph database, a new node in the graph database may be created for each of the one or more entities and an edge for each of the one or more attributes may be created. If the extracted attributes of the one or more entities is absent in the graph databased the attributes of the one or more entities in the graph database may be updated with the attributes extracted from the input data. One or more recommendations may be generated for the service catalogue, as in step 608. The generated one or more recommendations are displayed, as in step 610.

Figure 7:
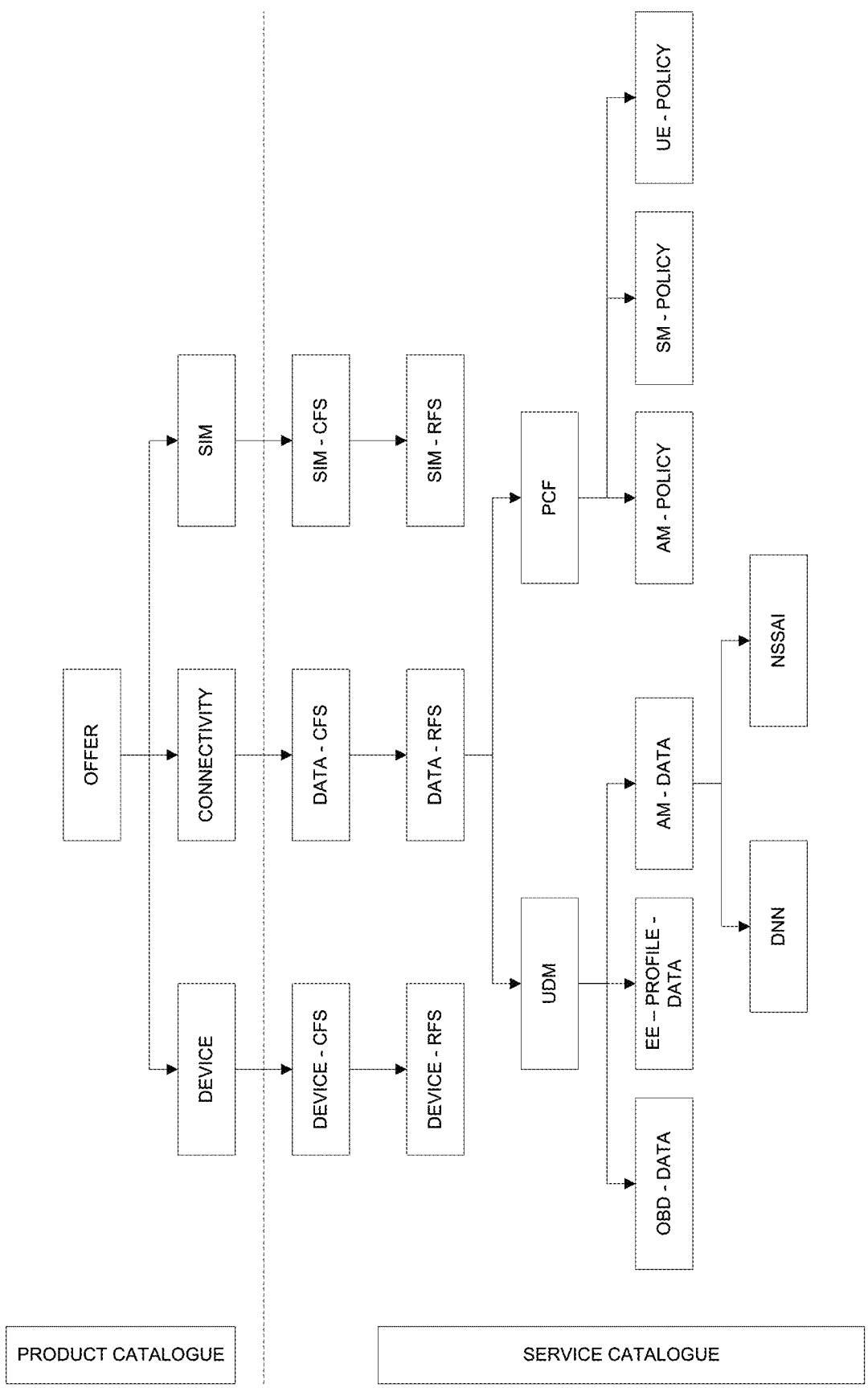
FIG. 7 depicts an illustrative service model for a 5G offer, according to one or more embodiments.

In an example embodiment, consider a service and resource modeling of a '5G offer'. FIG. 7 depicts an illustrative service model for a 5G offer. The model comprises of CFS (Customer Facing Service) and RFS (Resource Facing services). A modeler will create these specifications in the catalogue and these models will provide the necessary information to provision the required resources into the network at runtime. 3GPP publishes various specifications for network functions which contains the network functions resources, API specifications and the associated data model. The specifications will undergo revisions and the proposed solution is to find the discrepancies on these models in an automated way. In the example embodiment, UDM (Unified Data Management) network function holds data for various other network functions in the 5G network. 3GPP defines the specification for unified data repository and provides the resource definition and data model for subscription data. In order to provide the right insights to the service modeler on the discrepancies (changes), the AI engine will analyze and correlate the data to recommend the changes to the model and associated attributes from the 3GPP specification document. Consider a subscription data model which is derived from the 3GPP specification (3GPP TS 29.503). The cognitive data annotation and labeling services may look at the specification documents to derive the values to come up with the resource models in the graph database. FIG. 8 depicts the resource model and the resource attributes from the 3GPP specification document 800. The attributes for the different resources may have to be derived from the respective 3GPP technical specification document. For example, for 'am-data' the resource definition that is mapping in the specification document is 'accessandmobilitysubscription' data, based on which that system may map the specification document to extract the attributes.

TABLE 1

Sample Parameters in Integration Specification

| REST API End Point | Parameter for End Point | Method | Description |
|---|---|---|---|
| AccessAndMobility SubscriptionData | /subscription-data/{ueId}/ {servingPlmnId}/ provisioned-data/am-data | GET | Retrieve the UE's subscribed Access and Mobility Data |

TABLE 2

Sample from 3GPP Specification document

| Attribute Name' | Reference | Comments |
|---|---|---|
| AccessAndMobilitySub-scriptionData | 3GPP TS 29.503 [6] | Access and Mobility Subscription Data |

The document on the specification which is 295.03 is used. This document defines the specification mapping between Table 2 and Table 1 [AMF->Access and Mobility Management Function, GPSI->Generic Public Subscription Identifier]

The AI engine may identify all the specification characteristics for am-data resource from the specification document (3GPP TS 29.503). Once the specification characteristics are identified, the AI engine may compare the characteristics with OEM specification documents to include the additional attributes and may highlight the discrepancies, if any. For example, from 3GPP Specification the attributes for am (access and mobility) data is as illustrated in Table 3, and describing some attribute name—forbiddenAreas represents service restriction area and Gpsis represents generic public service identifier like telephone number, supportedFeatures represents voice and messaging services and also the hotspot feature.

TABLE 3

Network resource provisioning and/or Network service provisioning parameters example

| Attribute name | Data type |
|---|---|
| supportedFeatures | SupportedFeatures |
| gpsis | array(Gpsi) |
| internalGroupIds | array(GroupId) |
| vnGroupInfo | map(VnGroupData) |
| sharedVnGroupDataIds | map(SharedDataId) |
| subscribedUeAmbr | AmbrRm |
| nssai | Nssai |
| ratRestrictions | array(RatType) |
| forbiddenAreas | array(Area) |
| serviceAreaRestriction | ServiceAreaRestriction |
| coreNetworkTypeRestrictions | array(CoreNetworkType) |
| rfspIndex | RfspIndexRm |
| subsRegTimer | DurationSecRm |
| ueUsageType | UeUsageType |
| mpsPriority | MpsPriorityIndicator |
| mcsPriority | McsPriorityIndicator |
| activeTime | DurationSecRm |
| dlPacketCount | DlPacketCount |
| sorInfo | SorInfo |
| sorInfoExpectInd | Boolean |
| sorafRetrieval | boolean |
| sorUpdateIndicatorList | array(SorUpdateIndicator) |
| upuInfo | UpuInfo |
| micoAllowed | MicoAllowed |
| sharedAmDataIds | array(SharedDataId) |
| odbPacketServices | OdbPacketServices |
| subscribedDnnList | array(Dnn) |
| serviceGapTime | DurationSec |
| traceData | TraceData |
| cagData | CagData |
| stnSr | StnSr |
| cMsisdn | CMsisdn |
| nbIoTUePriority | NbIoTUePriority |
| nssaiInclusionAllowed | boolean |
| rg WirelineCharacteristics | RgWirelineCharacteristics |
| rgTMBR | TMBR |
| ecRestrictionData | EcRestrictionData |
| expectedUeBehaviour | ExpectedUeBehaviourData |
| maximumResponseTimeList | array(MaximumResponseTime) |
| maximumLatencyList | array(MaximumLatency) |
| primaryRatRestrictions | array(RatType) |

TABLE 3-continued

Network resource provisioning and/or Network service provisioning parameters example

| Attribute name | Data type |
|---|---|
| secondaryRatRestrictions | array(RatType) |
| edrxParametersList | array(EdrxParameters) |
| ptwParametersList | array(PtwParameters) |
| iabOperationAllowed | boolean |
| nrV2xServicesAuth | NrV2xAuth |
| lteV2xServicesAuth | LteV2xAuth |
| nrUePc5Ambr | BitRate |
| ltePc5Ambr | BitRate |

The attributes defined in the OEM specification for AM data is as below.

Sample accessandmobility resource data form OEM-1 (JSON Format)

```
{
  "amData": {
    "defaultSingleNssais": [
      {
        "requiredAuthnAuthz": true,
        "supportNon3Gpp": true,
        "support3Gpp": true
      }
    ],
    "gpsis": [
      "{\"msisdn\":\"123455678\"}"
    ],
    "plmnAmData": {
      "123-456": {
        "forbiddenAreas": [
          {
            "tacs": [
              "a76111",
              "af7637",
              "4305"
            ]
          }
        ],
        "mcsPriority": true,
        "mdtConfiguration": "string",
        "mdtUserConsent": "string",
        "micoAllowed": true,
        "mpsPriority": true,
        "nbIoTUePriority": 0,
        "nssaiInclusionAllowed": false,
        "odbPacketServices": "string",
        "subscribedUeAmbr": {
          "downlink": "string",
          "uplink": "string"
        },
        "ueUsageType": 0
      }
    },
    "sorInfo": {
      "downlink": "string",
      "uplink": "string"
    }
  }
}
```

Sample UDM Structure form OEM-1 (XML Format)

```
<xs:complexType name="UdmAccessAndMobilitySubscriptionData">\
  <xs:annotation>
<xs:documentation>UDM Access and Mobility Subscription
Data</xs:documentation>
</xs:annotation>
<xs:complexContent>
<xs:extension base="spml:SecondClassObject">
<xs:sequence>
<xs:element name="supportedFeatures" type="subscriber:HexadecimalString"
minOccurs="0"/>
<xs:element name="genPublicSubscriptionIds" type="xsd:string" minOccurs="0"
maxOccurs="unbounded"/>
  <xs:element name="internalGroupIds" type="xsd:string" minOccurs="0"
maxOccurs="unbounded"/>
  <xs:element name="subUeAmbrUpLink" type="xsd:decimal" minOccurs="0"/>
<xs:element name="subUeAmbrUpLinkUnits"
type="subscriber:UpLinkDownLinkUnits" minOccurs="0"/>
<xs:element name="subUeAmbrDownLink" type="xsd:decimal" minOccurs="0"/>
<xs:element name="subUeAmbrDownLinkUnits"
type="subscriber:UpLinkDownLinkUnits" minOccurs="0"/>
<xs:element name="accessRestr" type="xsd:string" minOccurs="0"
maxOccurs="unbounded"/>
<xs:element name="coreNetworkTypeRestriction" type="xsd:string" minOccurs="0"
maxOccurs="unbounded"/>
<xs:element name="rfspIndex" type="subscriber:NumericString" minOccurs="0"/>
<xs:element name="micoAllowed" type="xsd:boolean" minOccurs="0"/>
<xs:element name="subsRegTimer" type="subscriber:NumericString"
minOccurs="0"/>
<xs:element name="ueUsageType" type="subscriber:NumericString"
minOccurs="0"/>
<xs:element name="local AreaDataNtwInfo" type="xsd:string" minOccurs="0"
maxOccurs="unbounded"/>
<xs:element name="mpsPriority" type="xsd:boolean" minOccurs="0"/>
<xs:element name="activeTime" type="subscriber:NumericString" minOccurs="0"/>>
<xs:element name="downLinkPktCount" type="xsd:integer" minOccurs="0"/>
<xs:element name="nssai" type="subscriber:UdmNssai" minOccurs="0"/>
<xs:element name="serviceAreaRestriction"
type="subscriber:UdmServiceAreaRestriction" minOccurs="0"/>
<xs:element name="forbiddenAreas" type="subscriber:UdmForbiddenAreas"
minOccurs="0" />
```

```
<xs:element name="mcsPriority" type="xsd:boolean" minOccurs="0"/>
<xs:element name="odbPacketServices" type="xsd:string" minOccurs="0"/>
<xs:element name="lastModifiedTime4ProvisionedData" type="xsd:string"
minOccurs="0"/>
<xs:element name="subscribedDnnList" type="xsd:string" minOccurs="0"
maxOccurs="unbounded"/>
</xs:sequence>
</xs:extension>
</xs:complexContent>
</xs:complexType>
<xs:complexType name="UdmServiceAreaRestriction">
<xs:annotation>
<xs:documentation>UDM Service Area Restriction</xs:documentation>
</xs:annotation>
<xs:complexContent>
<xs:extension base="spml:SecondClassObject">
<xs:sequence>
<xs:element name="restrictionType" type="xsd:string" minOccurs="0"/>
<xs:element name="maxNumOfTAs" type="xsd:integer" minOccurs="0"/>
<xs:element name="area" type="subscriber:UdmArea" minOccurs="0"
maxOccurs="unbounded"/>
<xs:element name="maxNumOfTAsForNotAllowedAreas" type="xsd:integer"
minOccurs="0"/>
</xs:sequence>
</xs:extension>
</xs:complexContent>
</xs:complexType>
<xs:complexType name="UdmArea">
<xs:annotation>
<xs:documentation>UDM Area</xs:documentation>
</xs:annotation>
<xs:complexContent>
<xs:extension base="spml:SecondClassObject">
<xs:sequence>
<xs:element name="areaId" type="xsd:integer" minOccurs="0"/>
<xs:element name="tacs" type="subscriber:Tacs" minOccurs="0"
maxOccurs="unbounded"/>
<xs:element name="areaCodes" type="xsd:string" minOccurs="0"
maxOccurs="unbounded"/>
</xs:sequence>
</xs:extension>
</xs:complexContent>
</xs:complexType>
<xs:complexType name="UdmForbiddenAreas">
<xs:annotation>
<xs:documentation>Udm Forbidden Areas</xs:documentation>
</xs:annotation>
<xs:complexContent>
<xs:extension base="spml:SecondClassObject">
<xs:sequence>
<xs:element name="forbiddenAreasId" type="xsd:integer" minOccurs="0"/>
<xs:element name="tacs" type="subscriber:Tacs" minOccurs="0"
maxOccurs="unbounded"/>
<xs:element name="areaCodes" type="xsd:string" minOccurs="0"
maxOccurs="unbounded"/>
</xs:sequence>
</xs:extension>
</xs:complexContent>
</xs:complexType>
<xs:simpleType name="UpLinkDownLinkUnits">
<xs:restriction base="xsd:string">
<xs:enumeration value="bps"/>
<xs:enumeration value="Kbps"/>
<xs:enumeration value="Mbps"/>
<xs:enumeration value="Gbps"/>
<xs:enumeration value="Tbps"/>
</xs:restriction>
</xs:simpleType>
<xs:complexType name="UdmNssai">
<xs:annotation>
<xs:documentation>UDM Network Slice Selection Assistance
Information</xs:documentation>
</xs:annotation>
<xs:complexContent>
<xs:extension base="spml:SecondClassObject">
<xs:sequence>
```

-continued

```
<xs:element name="supportedFeatures" type="subscriber:HexadecimalString"
minOccurs="0"/>
<xs:element name="singleNssai" type="subscriber:UdmSingleNssai" minOccurs="0"
maxOccurs="unbounded"/>
</xs:sequence>
</xs:extension>
</xs:complexContent>
```

The AI engine may extract entities and attributes values and create the resource models in the graph database for access and mobility network function. The AI engine may populate the default characteristic values based on the network provider interface specification documents and build the hierarchical relationship based on the network model and present to the user as illustrated in FIG. 10 and FIG. 11.

Figure 10:
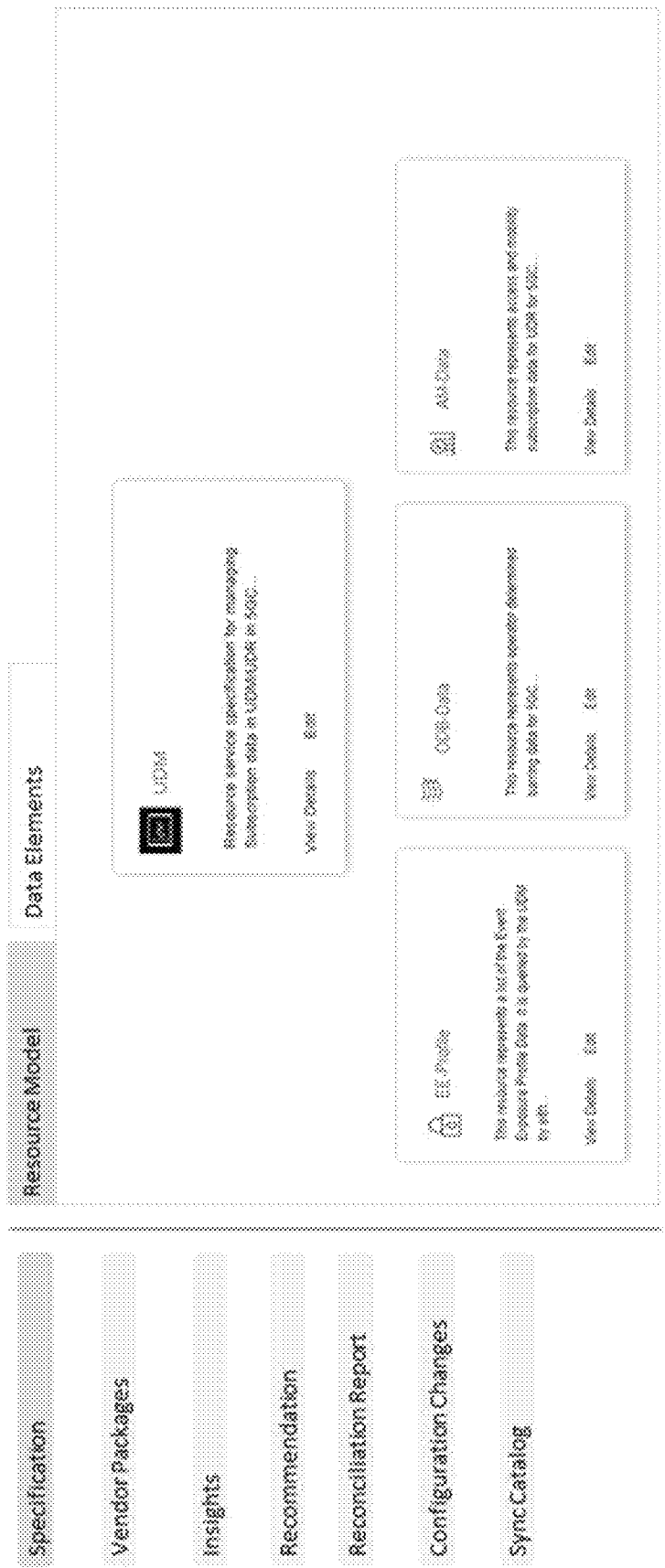
FIG. 10 is an exemplary screenshot of user interface illustrating Catalogue data model and hierarchy definitions, according to one or more embodiments.
Figure 11:
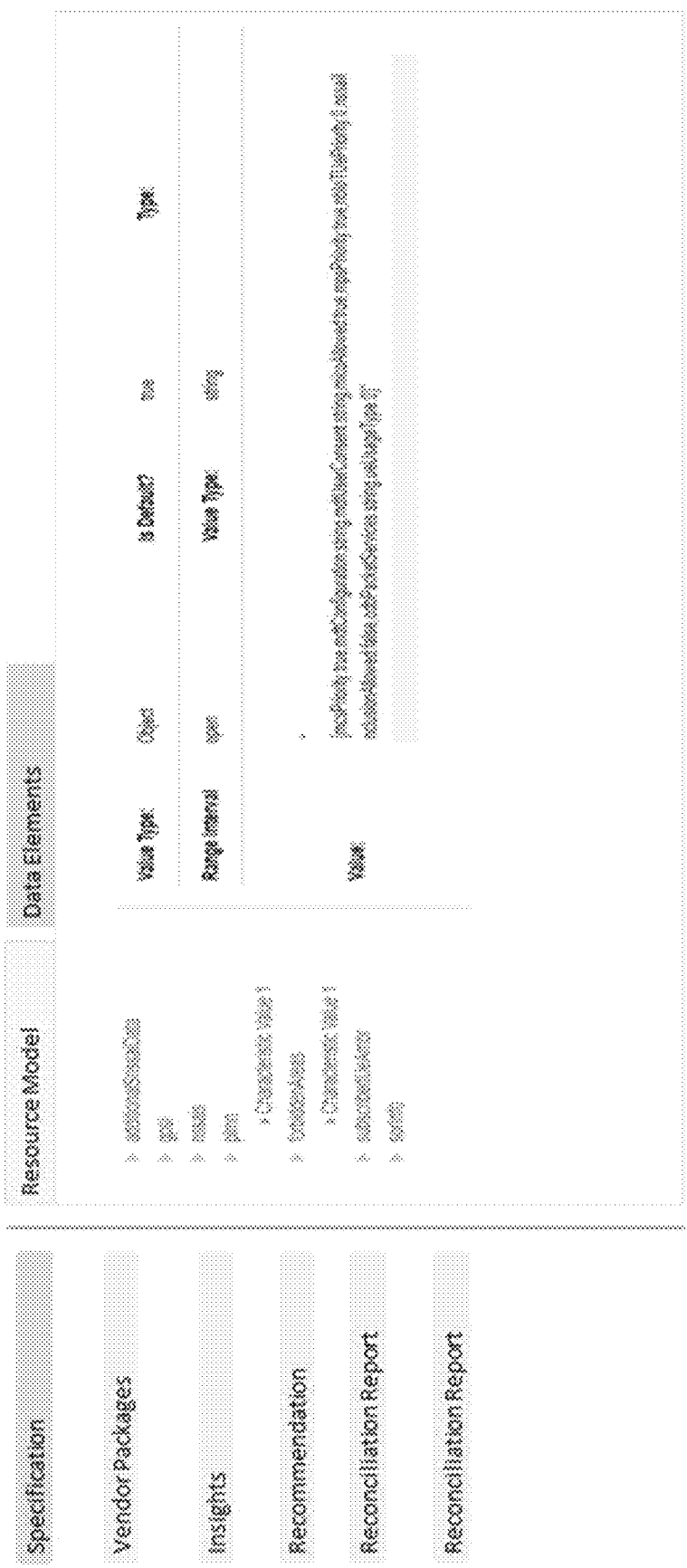
FIG. 11 is an exemplary screenshot of user interface illustrating illustrates attributes for any given network resources, according to one or more embodiments.

In one or more embodiments, FIG. 10 is an exemplary screenshot of user interface of the system disclosed in various embodiments of the present disclosure, which illustrates Catalogue data model and hierarchy definitions. FIG. 11 is an exemplary screenshot of user interface of the system disclosed in various embodiments of the present disclosure, which illustrates attributes for any given network resources.

In one or more embodiments, a non-transitory computer readable storage medium for Artificial Intelligence (AI) assisted service catalogue generation for network service provisioning is disclosed wherein the non-transitory computer readable medium comprising machine executable code which when executed by at least one processor, causes the at least one processor to perform steps comprising receiving input data which comprises either or combination of one or more specification documents or one or more configuration changes in network functions and/or network components. The one or more configuration changes may be received from data sources such as, but not limited to, network inventory, network configuration repository, network deployment CI/CD pipelines, Subscriber Identity Module (SIM) management information and/or end user device management information (or simply referred as Device Management information). The one or more specification documents comprises at least one of, but not limited to, standard documents describing communication protocols, industry standards, interface specifications and/or network functions released by, but not limited to, 3GPP, GSMA, TMF and/or MEF. One or more entities and attributes of the one or more entities may be extracted from the input data. The extracted one or more entities and the attributes of the one or more entities may be reconciled with a graph database representing network function model to determine modifications in the input data.

The reconciliation may be executed by classifying the one or more entities extracted from the input data and updating the graph database on determining that either the extracted one or more entities or the attributes of the one or more entities are absent in the graph database. The graph database may be updated by creating a new node in the graph database for each of the one or more entities when the extracted one or more entities are absent in the graph database. When the extracted attributes of the one or more entities is absent in the graph database, the attributes of the one or more entities may either be created or updated in the graph database. One or more recommendations comprising model elements are generated using AI engines, based on the reconciliation. The one or more recommendations comprise either addition or modifications of model elements to the service catalogue. The generated one or more recommendations may be displayed at the service modeler interface for generation of the service catalogue for network service provisioning.

The specification and drawings in the present disclosure are to be regarded in an illustrative rather than a restrictive sense.

What is claimed is:

1. A computer implemented method, for Artificial Intelligence (AI) assisted service catalogue generation for network service provisioning, comprising:
   receiving, by a processor, input data comprising: one or more specification documents, service model information related to existing service catalogue needing review and modifications, and one or more configuration changes in network components;
   extracting, by the processor, one or more entities and attributes of the one or more entities from the input data;
   reconciling, by the processor, the one or more entities and the attributes of the one or more entities with a graph database representing a network function model to determine modifications in the input data;
   generating, by the processor, one or more recommendations comprising addition or modification to model elements using AI engines, based on the reconciliation; and
   graphically displaying, by the processor, the one or more recommendations at a service modeler interface for generation of the service catalogue.

2. The computer implemented method of claim 1, wherein reconciling comprises:
   classifying, by the processor, the one or more entities extracted from the input data; and
   updating, by the processor, the graph database on determining that either the extracted one or more entities or the attributes of the one or more entities are absent in the graph database.

3. The computer implemented method of claim 2, wherein updating the graph database comprises:
   creating, by the processor, a new node in the graph database for each of the one or more entities and an edge for each of the one or more attributes when the extracted one or more entities are absent in the graph database.

4. The computer implemented method of claim 2, wherein updating the graph database comprises:
   updating, by the processor, the attributes of the one or more entities in the graph database, when the extracted attributes of the one or more entities are absent in the graph database.

5. The computer implemented method of claim 1, wherein the one or more specification documents comprises at least one of industry standards, interface specifications, or network functions.

6. The computer implemented method of claim 1, further comprising:

receiving, by the processor, the one or more configuration changes from one or more of: a network inventory, a network configuration repository, network deployment CI/CD pipelines, Subscriber Identity Module (SIM) management information and end user device management information.

7. The computer implemented method of claim 1, wherein the one or more entities are nouns and the one or more attributes associated with the one or more entities are one or more of: verbs, adjectives, and pronouns; and wherein the one or more recommendations comprise addition or modifications of model elements to the service catalogue.

8. The computer implemented method of claim 1, further comprising:
calculating, by the processor, costs based on computation requirement and network requirement in comparison to a previous service catalogue, for recommending the model elements to generate a new service catalogue.

9. The computer implemented method of claim 2, further comprising:
classifying, by the processor, the one or more entities extracted from the input data into pre-defined categories comprising one or more of: configuration parameters for network provisioning Unified Data Model, device management, SIM management, and Subscriber Services management parameters.

10. The computer implemented method of claim 2, further comprising:
updating, by the processor, edge information of a node corresponding to an entity, in case an old attribute associated with the entity is present in the graph database.

11. An Artificial Intelligence (AI) assisted service catalogue generation system for network service provisioning, comprising:
at least one processor; and
at least one memory unit operatively coupled to the at least one processor, having instructions stored thereon that, when executed by the at least one processor, causes the at least one processor to:
receive input data comprising: one or more specification documents, service model information related to existing service catalogue needing review and modifications, and one or more configuration changes in network components;
extract, one or more entities and attributes of the one or more entities from the input data;
reconcile the one or more entities and the attributes of the one or more entities with a graph database representing a network function model to determine modifications in the input data, wherein the graph database is configured to store parameters comprising device configuration parameters, SIM configuration parameters, and virtual network function (VNF) configuration parameters;
generate one or more recommendations comprising addition or modification to model elements using AI engines, based on the reconciliation; and
graphically display the one or more recommendations at a service modeler interface for generation of the service catalogue.

12. The system of claim 11, wherein reconciling causes the at least one processor to:
classify the one or more entities extracted from the input data into configuration parameters for network provisioning Unified Data Model (UDM), device management, SIM management, or subscriber services management parameters; and
update the graph database on determining that either the extracted one or more entities or the attributes of the one or more entities are absent in the graph database.

13. The system of claim 12, wherein updating the graph database causes the at least one processor to:
create a new node in the graph database for each of the one or more entities and an edge for each of the one or more attributes when the extracted one or more entities are absent in the graph database.

14. The system of claim 12, wherein updating the graph database causes the at least one processor to:
update the attributes of the one or more entities in the graph database, when the extracted attributes of the one or more entities are absent in the graph database.

15. The system of claim 11, wherein the one or more specification documents comprises at least one of industry standards, interface specifications, or network functions.

16. A non-transitory computer readable medium having stored thereon instructions for Artificial Intelligence (AI) assisted service catalogue generation for network service provisioning, the non-transitory computer readable medium comprising machine executable code which when executed by at least one processor, causes the at least one processor to perform steps comprising:
receiving input data comprising at least one or combination of: one or more specification documents, service model information related to existing service catalogue needing review and modifications, and one or more configuration changes in network components;
extracting one or more entities and attributes of the one or more entities from the input data;
reconciling the one or more entities and the attributes of the one or more entities with a graph database representing a network function model to determine modifications in the input data;
generating one or more recommendations comprising addition or modification to model elements using AI engines, based on the reconciliation; and
graphically displaying the one or more recommendations at a service modeler interface for generation of the service catalogue.

17. The non-transitory computer readable medium of claim 16, wherein reconciling comprises:
classifying the one or more entities extracted from the input data; and
updating the graph database on determining that either the extracted one or more entities or the attributes of the one or more entities are absent in the graph database.

18. The non-transitory computer readable medium claim 17, wherein updating the graph database, comprising:
creating a new node in the graph database for each of the one or more entities and an edge for each of the one or more attributes when the extracted one or more entities are absent in the graph database.

19. The non-transitory computer readable medium of claim 17, wherein updating the graph database, comprising:
updating the attributes of the one or more entities in the graph database, when the extracted attributes of the one or more entities are absent in the graph database.

20. The non-transitory computer readable medium of claim 16, wherein the one or more specification documents comprises at least one of industry standards, interface specifications, or network functions.

\* \* \* \* \*